(12) United States Patent
Chen et al.

(10) Patent No.: US 11,162,636 B2
(45) Date of Patent: Nov. 2, 2021

(54) SUPPORTING DEVICE

(71) Applicant: PEGATRON CORPORATION, Taipei (TW)

(72) Inventors: Hsiao-Fan Chen, Taipei (TW); Hui-Chen Wang, Taipei (TW); Yi-Chun Tang, Taipei (TW); Chun-Fu Chang, Taipei (TW)

(73) Assignee: PEGATRON CORPORATION, Taipei (TW)

( * ) Notice: Subject to any disclaimer, the term of this patent is extended or adjusted under 35 U.S.C. 154(b) by 6 days.

(21) Appl. No.: 16/906,980

(22) Filed: Jun. 19, 2020

(65) Prior Publication Data

US 2021/0003245 A1    Jan. 7, 2021

(30) Foreign Application Priority Data

Jul. 5, 2019 (TW) .................................. 108123763

(51) Int. Cl.
| | | |
|---|---|---|
| *A47G 1/24* | (2006.01) | |
| *F16M 13/02* | (2006.01) | |
| *F16M 11/10* | (2006.01) | |
| *A45C 11/00* | (2006.01) | |

(52) U.S. Cl.
CPC ........... *F16M 13/022* (2013.01); *A45C 11/00* (2013.01); *F16M 11/10* (2013.01); *A45C 2011/003* (2013.01)

(58) Field of Classification Search
CPC ...... F16M 13/022; F16M 11/10; A45C 11/00; A45C 2011/003; A47B 23/042; A47B 23/043

USPC ..................... 248/201, 441.1, 454; 455/575.1
See application file for complete search history.

(56) References Cited

U.S. PATENT DOCUMENTS

| | | | | |
|---|---|---|---|---|
| 7,614,599 | B2 * | 11/2009 | Moon ..................... | H04M 1/04 248/454 |
| 8,328,153 | B2 * | 12/2012 | Yang ....................... | F16M 11/38 248/370 |
| 2006/0108494 | A1 * | 5/2006 | Lancet .................. | A47B 23/043 248/456 |
| 2021/0227960 | A1 * | 7/2021 | Carnevali .............. | A45C 11/00 |

FOREIGN PATENT DOCUMENTS

| | | |
|---|---|---|
| CN | 102770000 | 11/2012 |
| CN | 104252197 | 12/2014 |
| CN | 107165927 | 9/2017 |
| TW | M257692 | 3/2005 |
| TW | M490727 | 11/2014 |

* cited by examiner

*Primary Examiner* — Todd M Epps
(74) *Attorney, Agent, or Firm* — J.C. Patents (57) ABSTRACT

A supporting device includes a first bracket, a back cover, and a sliding mechanism. The sliding mechanism is located between the back cover and the first bracket. The sliding mechanism includes a guiding portion, a sliding portion, and a stopper. The guiding portion is disposed at the first bracket and has a guiding slot, where the guiding slot has a first end and a second end opposite to each other. The sliding portion is disposed at the back cover, and adapted to slide in the guiding slot along a sliding direction. The stopper is located between the first end and the second end of the guiding slot and is adapted to move out of the guiding slot in a moving direction perpendicular to the sliding direction.

10 Claims, 11 Drawing Sheets

SUPPORTING DEVICE

CROSS-REFERENCE TO RELATED APPLICATION

This application claims the priority benefit of Taiwan application no. 108123763, filed on Jul. 5, 2019. The entirety of the above-mentioned patent application is hereby incorporated by reference herein and made a part of this specification.

BACKGROUND

Technical Field

The disclosure relates to a supporting device, and more particularly, to a supporting device which can provide three angles.

Description of Related Art

With the advantage of being easy to carry around to allow users to send/receive and process information in real time, portable electronic products have become indispensable tools for modern people.

In a tablet computer integrated with a docking station, the tablet computer has only two unfolding angles (i.e., being folded and being fully unfolded) with respect to the docking station of the tablet computer. However, with the popularity of the portable electronic products, the manufacturers cannot predict the environments and conditions of use of the users. Therefore, the two conventional unfolding angles cannot meet the requirements of all users.

For example, when a user uses a notebook computer in an environment without a desk, the user generally unfolds the notebook computer and places it on his or her legs to conveniently operate the keyboard or view the screen. At this time, the weight of the screen end may make the entire device unstable and fall backward. Therefore, how to design a supporting device that can meet the environments and conditions of use of the user to assemble it to a portable electronic product has currently become an issue to be solved.

SUMMARY

The disclosure provides a supporting device which can provide three angles and can be used in different environments and conditions and thus provide excellent convenience.

A supporting device of the disclosure includes a first bracket, a back cover, and a sliding mechanism. The sliding mechanism is located between the back cover and the first bracket. The sliding mechanism includes a guiding portion, a sliding portion, and a stopper. The guiding portion is disposed at the first bracket and has a guiding slot. The guiding slot has a first end and a second end opposite to each other. The sliding portion is disposed at the back cover, and the sliding portion is adapted to be disposed in the guiding slot to slide along a sliding direction. The stopper is located between the first end and the second end of the guiding slot and is adapted to move out of the guiding slot along a moving direction perpendicular to the sliding direction. When the sliding portion is located at the first end of the guiding slot, a first angle is formed between the back cover and the first bracket. When the sliding portion slides in the guiding slot to abut the stopper, a second angle is formed between the back cover and the first bracket. When the stopper moves out of the guiding slot and the sliding portion slides to the second end of the guiding slot, a third angle is formed between the back cover and the first bracket.

Based on the above, the supporting device of the disclosure includes the first bracket, the back cover, and the sliding mechanism. The sliding mechanism includes the guiding portion, the sliding portion, and the stopper. The guiding portion is disposed at the first bracket and the sliding portion is disposed at the back cover, so that the first bracket and the back cover are linked with each other. In other words, through the cooperation between the sliding portion and the stopper of the sliding mechanism, the first angle, the second angle, or the third angle can be formed between the back cover and the first bracket.

To make the aforementioned more comprehensible, several embodiments accompanied with drawings are described in detail as follows.

DESCRIPTION OF THE EMBODIMENTS

Figure 1A:
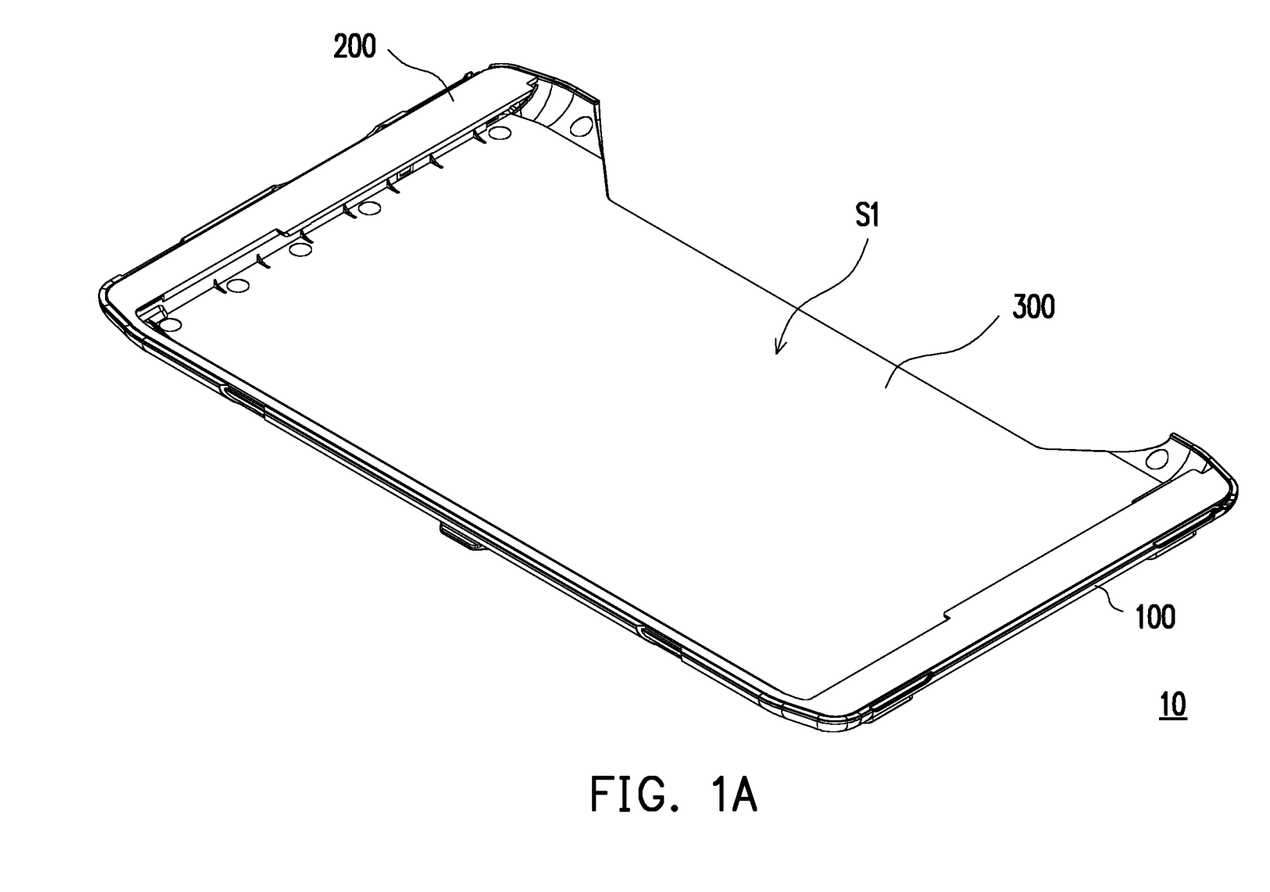
FIG. 1A to FIG. 1C are schematic perspective views showing a supporting device in different states according to an embodiment of the disclosure.
Figure 1B:
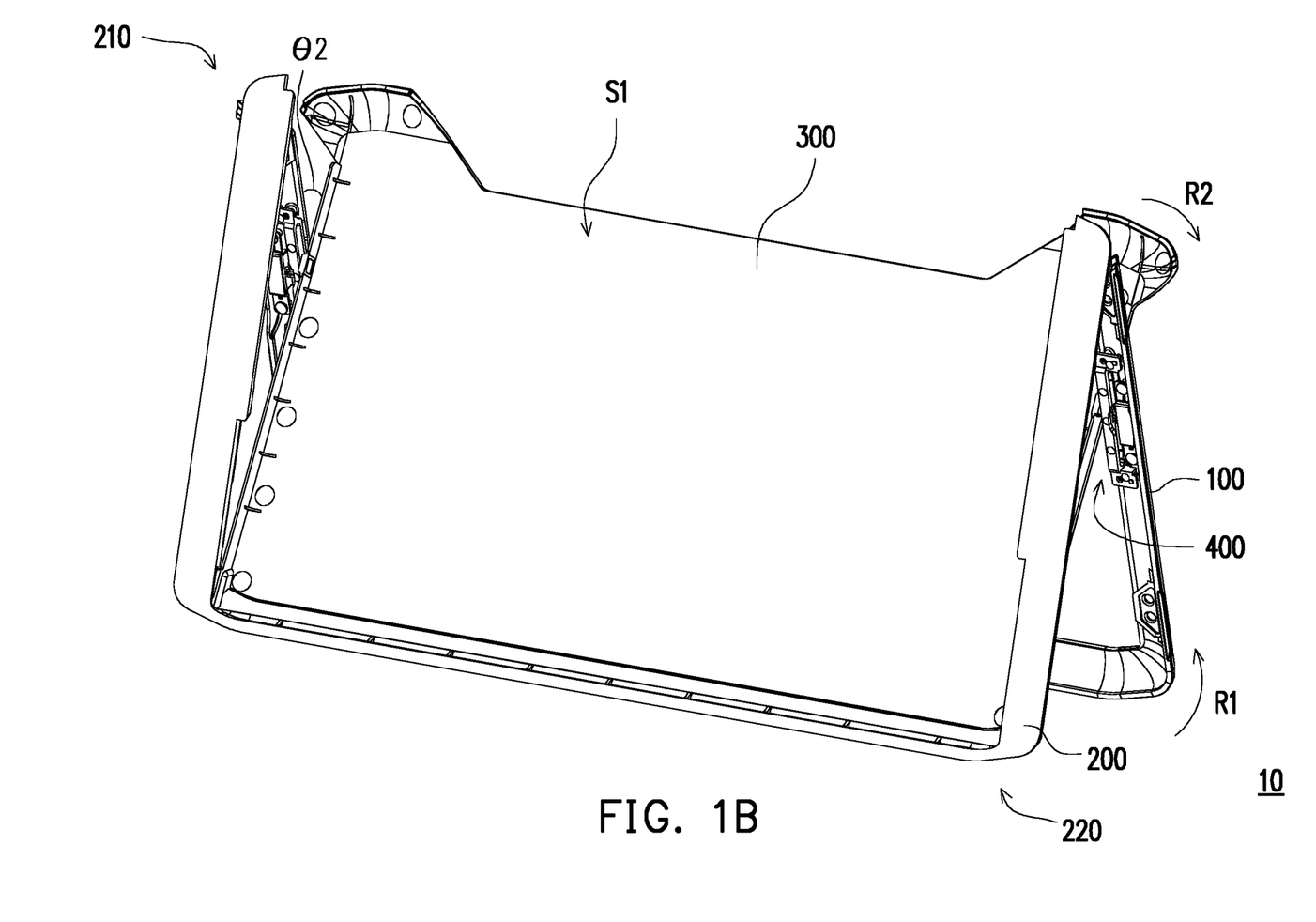
Figure 1C:
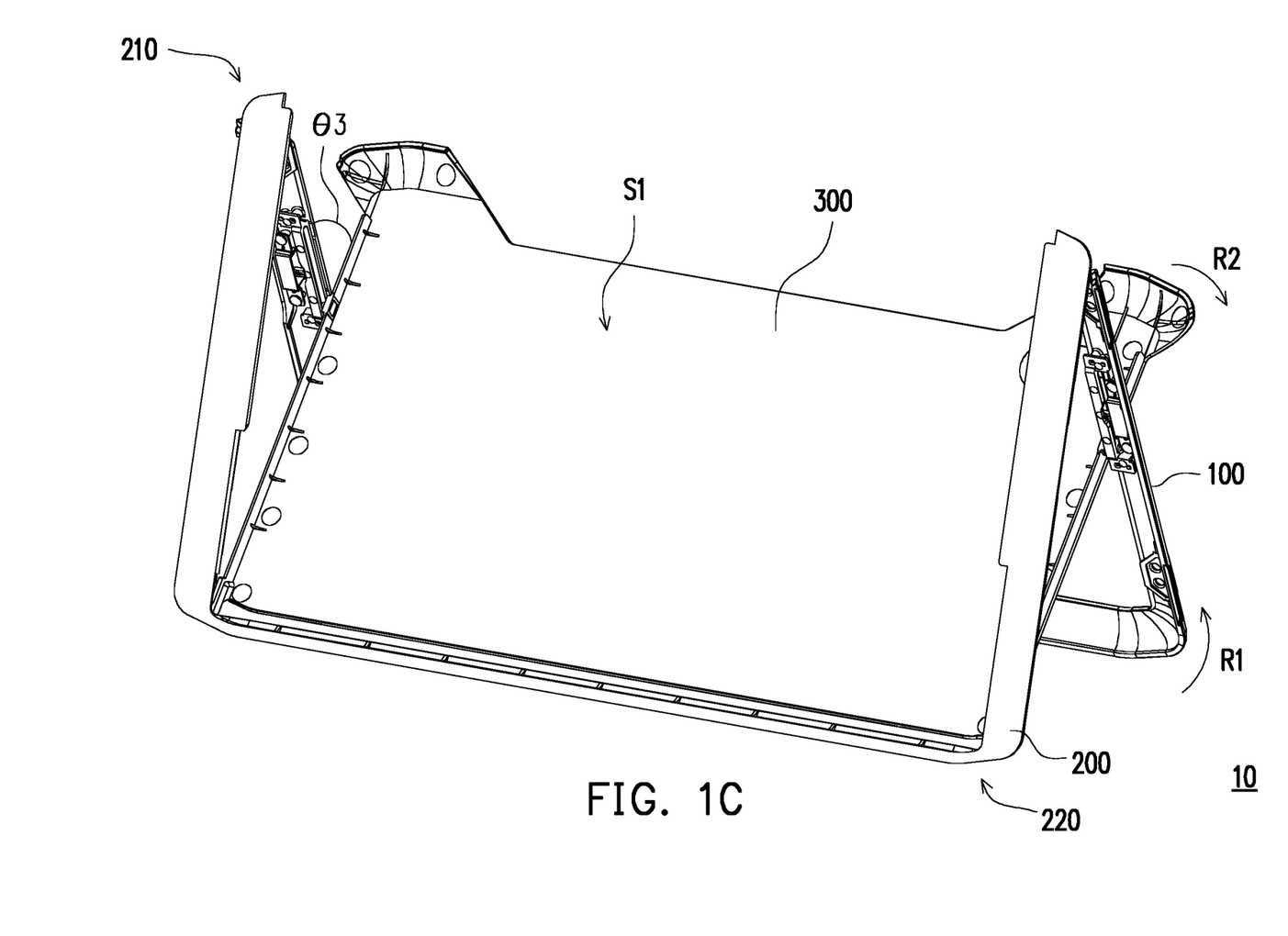

FIG. 1A to FIG. 1C are schematic perspective views showing a supporting device in different states according to an embodiment of the disclosure. Referring to FIG. 1A to FIG. 1C, in this embodiment, a supporting device 10 includes a first bracket 100, a second bracket 200, and a back cover 300. The supporting device 10 may be assembled to an electronic product (not shown). For example, a tablet computer (not shown) may be disposed on a first surface S1 of the back cover 300, or a lower body (keyboard) (not shown) of a notebook computer may be disposed on the first surface S1 of the back cover 300. In this embodiment, the electronic products can achieve three different unfolding angles through the supporting device 10. Of course, the electronic product to which the supporting device 10 is applicable is not limited to the above, and the operating mechanism of the supporting device 10 will be described in detail below.

Referring to FIG. 1B, in this embodiment, the second bracket 200 has a first side 210 and a second side 220 opposite to each other. The first bracket 100 is pivotally connected to the first side 210 of the second bracket 200, and the back cover 300 is pivotally connected to the second side 220 of the second bracket 200. In this embodiment, the supporting device 10 further includes a sliding mechanism 400, and the sliding mechanism 400 is located between the back cover 300 and the first bracket 100.

As shown in FIG. 1A, in a general case, the supporting device 10 is in a folded initial state. At this time, a first angle (not labeled) is formed between the back cover 300 and the first bracket 100. Here, the first angle is 0 degrees. As shown in FIG. 1B or FIG. 1C, when the user is to operate the supporting device 10, the user may turn the first bracket 100 in a first rotation direction R1 with respect to the second bracket 200. At this time, the back cover 300 is turned in a second rotation direction R2 with respect to the first bracket 100 through the driving of the sliding mechanism 400, so that a second angle θ2 as shown in FIG. 1B or a third angle θ3 as shown in FIG. 1C is formed between the back cover 300 and the first bracket 100. In this embodiment, the third angle θ3 shown in FIG. 1C is larger than the second angle θ2 shown in FIG. 1B.

Accordingly, by using the supporting device 10 of this embodiment, the user can adjust the angle between the back cover 300 (which may be assembled with an electronic product) and the first bracket 100 according to the environment and conditions of use to meet the user's requirements. In addition, the first bracket 100 and the second bracket 200 can be used to support the entire electronic product for the user to operate stably. For example, when the user is in an environment without a desk, the user may place an electronic product assembled with the supporting device 10 on his or her legs. With three unfolding angles of the supporting device 10, it is possible to adapt to the operating habits of different users. Moreover, the first bracket 100, the second bracket 200, and the back cover 300 can support the entire electronic product stably, so as to avoid instability of the electronic product which is not favorable for operation. In other words, the supporting device 10 of this embodiment has three unfolding angles, which allows the user to use in different environments and conditions and provides excellent convenience.

Figure 2A:
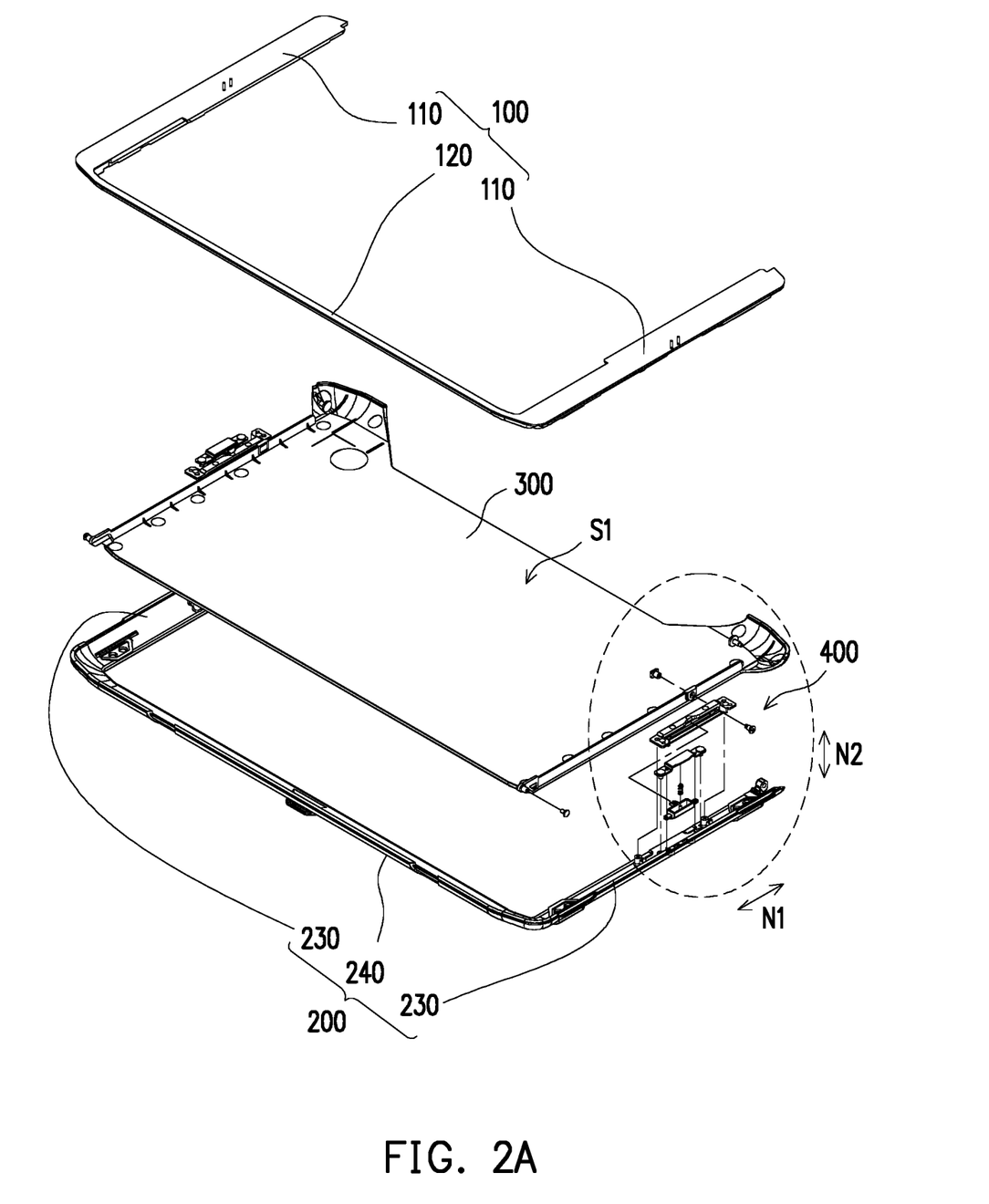
FIG. 2A is an exploded view showing the supporting device of FIG. 1A.
Figure 2B:
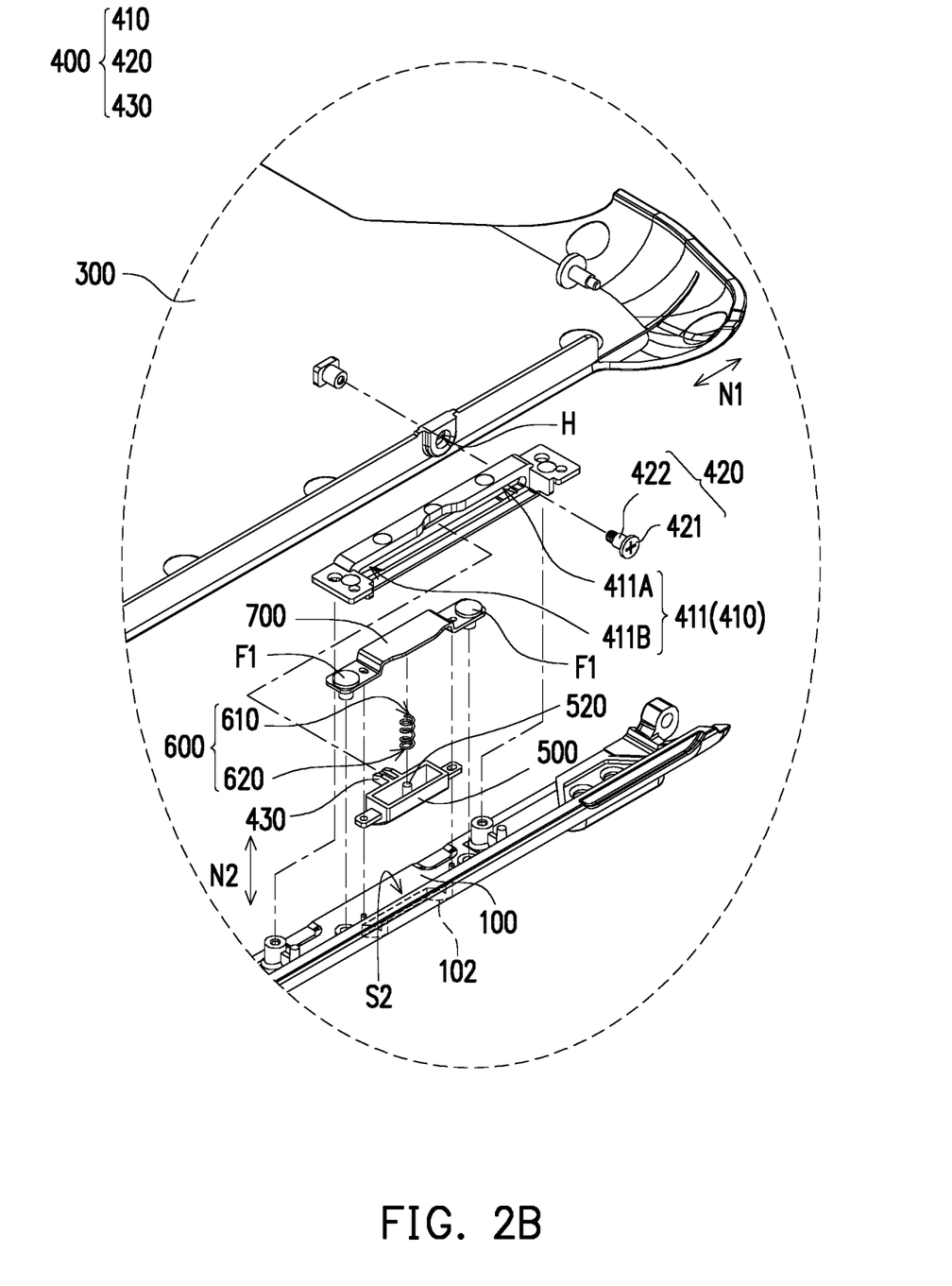
FIG. 2B is a partially enlarged schematic view of FIG. 2A.

FIG. 2A is an exploded view showing the supporting device of FIG. 1A. FIG. 2B is a partially enlarged schematic view of FIG. 2A. Referring to FIG. 2A, in this embodiment, the second bracket 200 includes two first portions 230 opposite to each other and a second portion 240 connected between the two first portions 230. The first bracket 100 includes two third portions 110 opposite to each other and a fourth portion 120 connected between the two third portions 110. In this embodiment, the back cover 300 is pivotally connected to the second portion 240, and the two third portions 110 are respectively pivotally connected to the two first portions 230.

Specifically, referring to FIG. 2B, the sliding mechanism 400 includes a guiding portion 410, a sliding portion 420, and a stopper 430. The guiding portion 410 is disposed at the first bracket 100 and has a guiding slot 411. The guiding slot 411 has a first end 411A and a second end 411B opposite to each other. The sliding portion 420 is disposed at the back cover 300, and the sliding portion 420 is disposed in the guiding slot 411 to be slidable along a sliding direction N1. In this embodiment, the sliding portion 420 is a screw but is not limited thereto in other embodiments.

Further, in this embodiment, the sliding portion 420 includes a cap portion 421 and a neck portion 422 connected to the cap portion 421. The end of the neck portion 422 is screw-fixed to a screw hole H of the back cover 300, so that the sliding portion 420 is linked with the back cover 300. The neck portion 422 slides in the guiding slot 411 along the sliding direction N1. In this embodiment, a dimension of the cap portion 421 is larger than a dimension of the guiding slot 411, so that the sliding portion 420 does not fall out of the guiding slot 411 in a direction perpendicular to the sliding direction N1 (i.e., the upper-left and lower-right directions in FIG. 2B).

Furthermore, the supporting device 10 further includes a button 500, an elastic member 600, and a stop plate 700. The button 500 is connected to the stopper 430. The first bracket 100 has a through hole 102, and the button 500 is located in the through hole 102 and is exposed. In this embodiment, the stop plate 700 is disposed on a second surface S2 (inner surface) of the first bracket 100 and covers the button 500. Specifically, the stop plate 700 is locked to the second surface S2 of the first bracket 100 by two locking members F1 but is not limited thereto in other embodiments.

In this embodiment, the elastic member 600 is accommodated in the button 500 and has a first fixing end 610 and a second fixing end 620. The first fixing end 610 of the elastic member 600 is connected to a bottom portion 510 (FIG. 3B) of the button 500, and the second fixing end 620 of the elastic member 600 is connected to the stop plate 700. In addition, in this embodiment, the button 500 further includes a guide post 520 located on the bottom portion 510 (FIG. 3B), and the elastic member 600 is sleeved on the guide post 520. In this embodiment, the guide post 520 is configured to guide the movement path of the elastic member 600 when it is compressed by the button 500. However, in other embodiments, the configuration of the guide post 520 may be adjusted according to the manufacturing process and is not limited thereto.

Figure 3A:
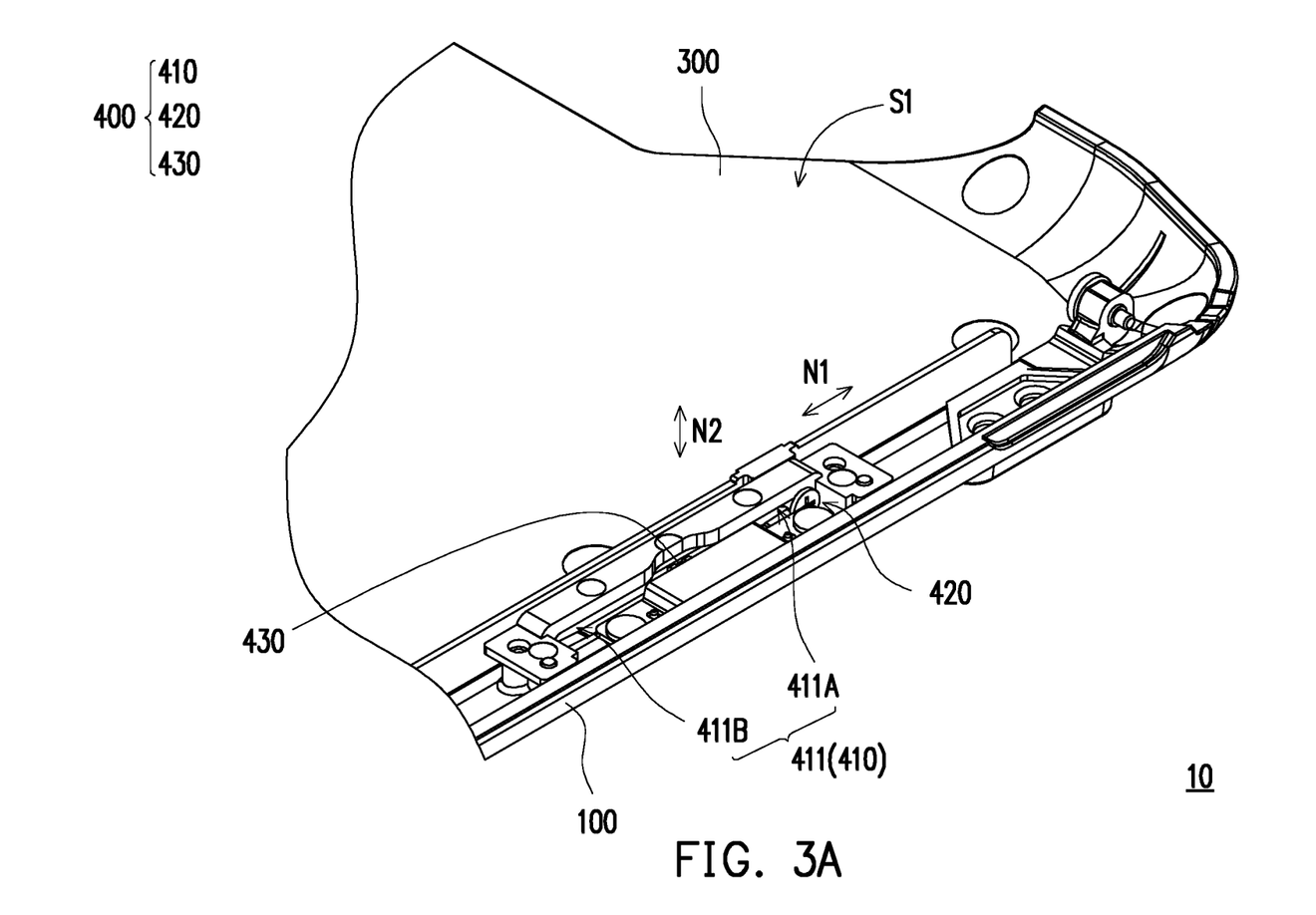
FIG. 3A is a partially enlarged schematic view showing the supporting device of FIG. 1A.
Figure 3B:
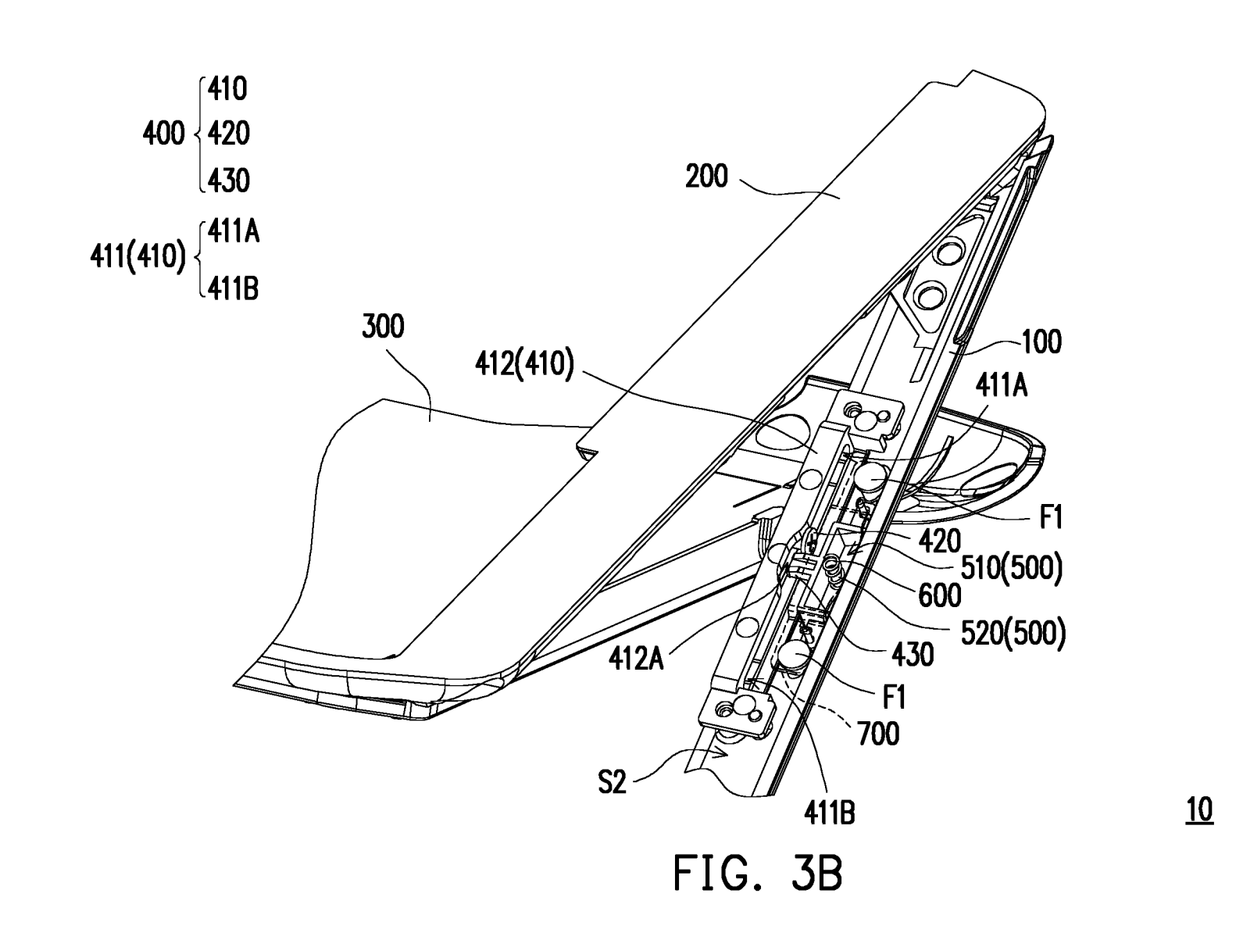
FIG. 3B is a partially enlarged schematic view showing the supporting device of FIG. 1B.
Figure 3C:
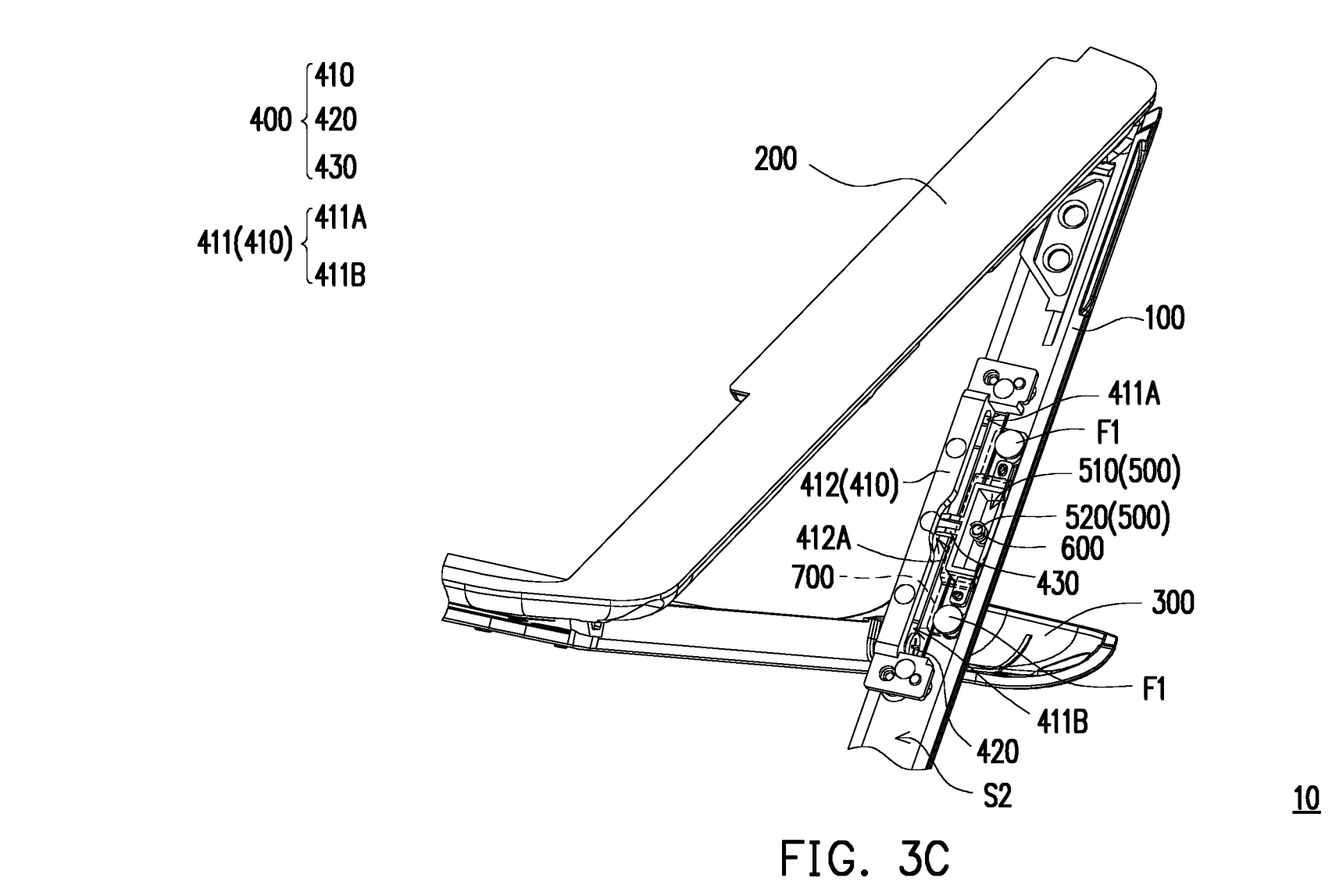
FIG. 3C is a partially enlarged schematic view showing the supporting device of FIG. 1C.
Figure 4:
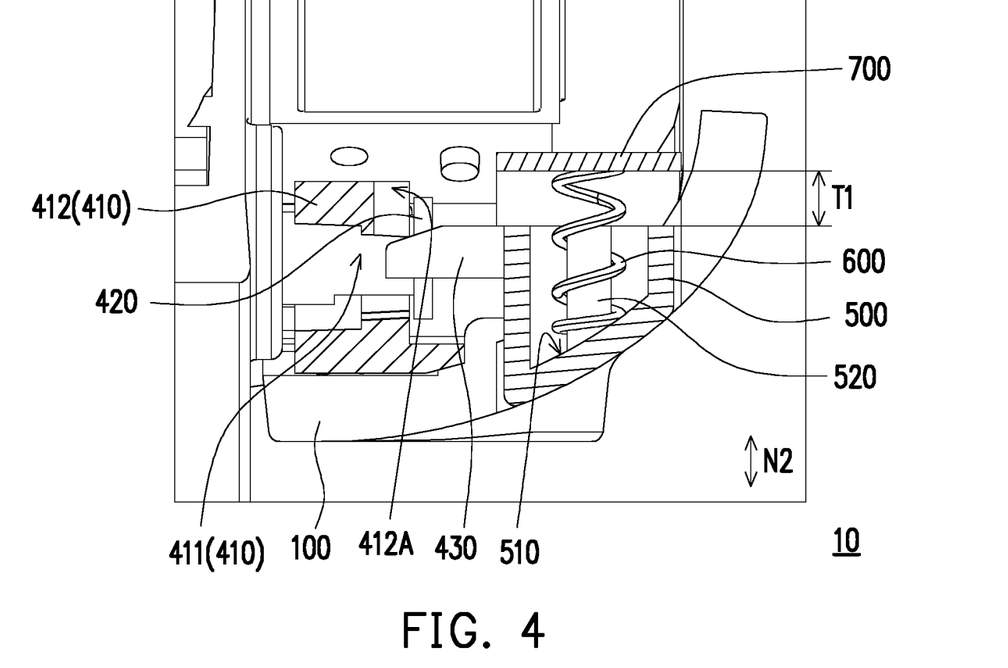
FIG. 4 is a schematic cross-sectional view showing the supporting device of FIG. 3B.
Figure 5:
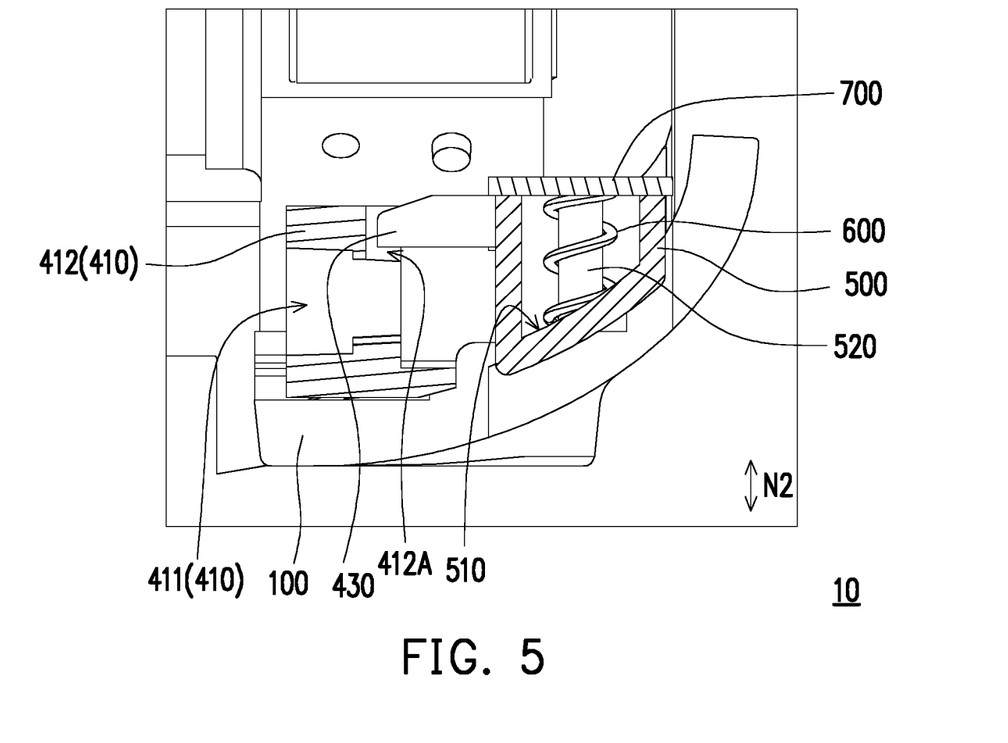
FIG. 5 is a schematic cross-sectional view showing the supporting device of FIG. 3C.
Figure 6:
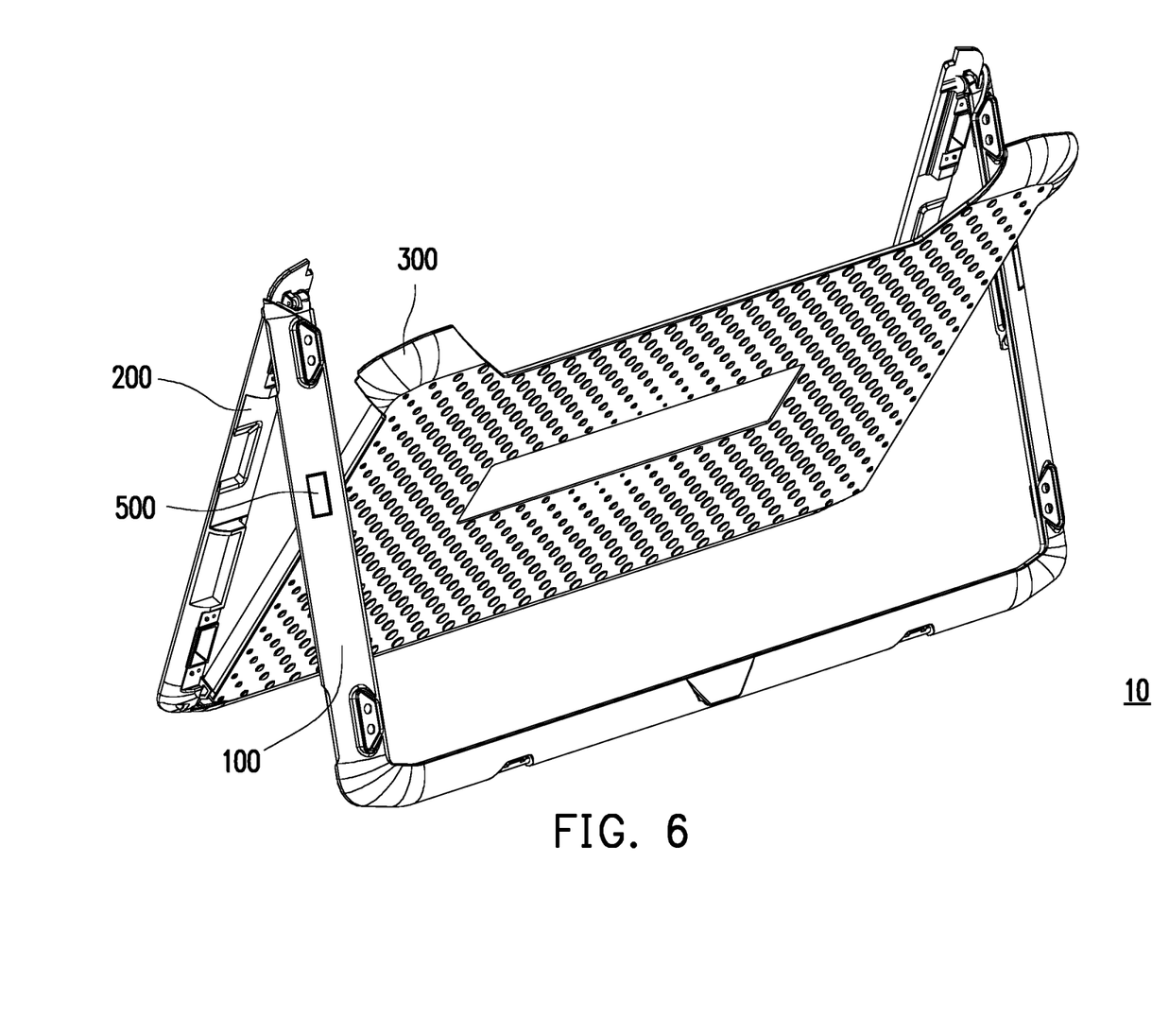
FIG. 6 is a schematic perspective view showing the button of the supporting device of FIG. 1B which is in an unpressed state.
Figure 7:
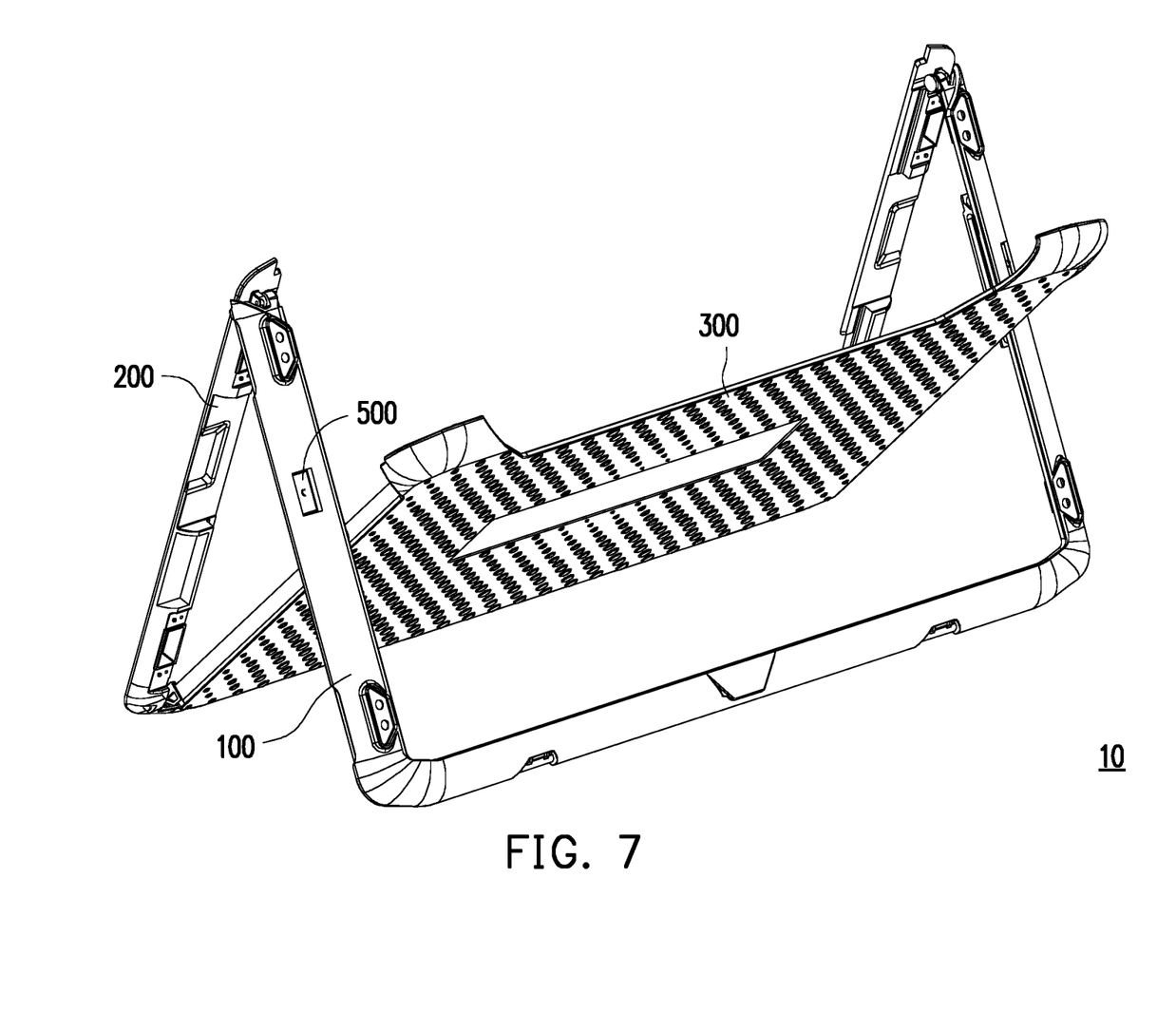
FIG. 7 is a schematic perspective view showing the button of the supporting device of FIG. 1C which is in a pressed state.

FIG. 3A is a partially enlarged schematic view showing the supporting device of FIG. 1A. FIG. 3B is a partially enlarged schematic view showing the supporting device of FIG. 1B. FIG. 3C is a partially enlarged schematic view showing the supporting device of FIG. 1C. FIG. 4 is a schematic cross-sectional view showing the supporting device of FIG. 3B. FIG. 5 is a schematic cross-sectional view showing the supporting device of FIG. 3C. FIG. 6 is a schematic perspective view showing the button of the supporting device of FIG. 1B which is in an unpressed state. FIG. 7 is a schematic perspective view showing the button of the supporting device of FIG. 1C which is in a pressed state.

It is noted that, in FIG. 3A, the second bracket 200 is omitted to more clearly illustrate the sliding mechanism 400. In FIG. 3B and FIG. 3C, the stop plate 700 is made transparent to more clearly illustrate the sliding mechanism 400.

Referring to FIG. 3A and FIG. 6, when the sliding portion 420 is located at the first end 411A of the guiding slot 411, the first angle is formed between the back cover 300 and the first bracket 100 as shown in FIG. 3A. In this embodiment, the button 500 is exposed on the first bracket 100 for the user to press.

Referring to FIG. 3B and FIG. 4, the stopper 430 reaches into the guiding slot 411 and is located between the first end 411A and the second end 411B of the guiding slot 411. When the sliding portion 420 slides in the guiding slot 411 to abut the stopper 430, the second angle is formed between the back cover 300 and the first bracket 100 as shown in FIG. 3B. As shown in FIG. 4, when the button 500 is in an unpressed state, the stopper 430 is located in the guiding slot 411, and there is a reserved gap T1 formed between the stop plate 700 and the button 500.

Referring to FIG. 3C, FIG. 5, and FIG. 7, in this embodiment, when the button 500 is in a pressed state, the button 500 moves toward the stop plate 700 and compresses the elastic member 600 to reduce the reserved gap T1 (FIG. 4). The stopper 430 can move out of the guiding slot 411 along a moving direction N2 (FIG. 5) perpendicular to the sliding direction N1. Therefore, when the button 500 is pressed, the button 500 drives the stopper 430 to move out of the guiding slot 411 along the moving direction N2.

Accordingly, the sliding portion 420 is not blocked by the stopper 430 and can slide to the second end 411B of the guiding slot 411, and the third angle is formed between the back cover 300 and the first bracket 100 as shown in FIG. 3C.

Specifically, it can be seen from FIG. 3C that, in this embodiment, the guiding portion 410 includes a guiding slot top wall 412 facing the second bracket 200, and the guiding slot top wall 412 has a notch 412A. When the button 500 is pressed and moved along the moving direction N2 (FIG. 5), the button 500 drives the stopper 430 to move out of the guiding slot 411 and be located in the notch 412A to allow the sliding portion 420 to pass. In other words, in this embodiment, the user can adjust the position of the stopper 430 by pressing the button 500 to further adjust the supporting device 10 from the position in FIG. 3B to the position in FIG. 3C. Similarly, when the user is to adjust the supporting device 10 to the position of FIG. 3A, as long as the button 500 is pressed again, the stopper 430 can be moved out of the guiding slot 411 along the moving direction N2, so that the sliding portion 420 can be moved to the first end 411A of the guiding slot 411.

In summary of the above, the supporting device of the disclosure includes the first bracket, the second bracket, the back cover, and the sliding mechanism. The sliding mechanism includes the guiding portion, the sliding portion, and the stopper. The guiding portion is disposed at the first bracket and the sliding portion is disposed at the back cover, so that the first bracket and the back cover are linked with each other. In other words, through the cooperation between the sliding portion and the stopper of the sliding mechanism, the first angle, the second angle, or the third angle can be formed between the back cover and the first bracket. Specifically, in the initial state, the supporting device is folded. When the user is to operate the supporting device, the sliding portion can be slid in the guiding slot of the first bracket along the sliding direction to abut the stopper, so that the second angle is formed between the back cover and the first bracket. When the user presses the button, the button drives the stopper to move out of the guiding slot along the moving direction perpendicular to the sliding direction to allow the sliding portion to pass, so that the third angle is formed between the back cover and the first bracket. The supporting device of the disclosure has three unfolding angles to allow the user to use in different environments and conditions, which provides excellent convenience.

It will be apparent to those skilled in the art that various modifications and variations can be made to the disclosed embodiments without departing from the scope or spirit of the disclosure. In view of the foregoing, it is intended that the disclosure covers modifications and variations provided that they fall within the scope of the following claims and their equivalents.

What is claimed is:
1. A supporting device comprising:
a first bracket;
a back cover; and
a sliding mechanism located between the back cover and the first bracket, and comprising:
a guiding portion disposed at the first bracket and having a guiding slot, wherein the guiding slot has a first end and a second end opposite to each other;
a sliding portion disposed at the back cover and adapted to be disposed in the guiding slot to slide along a sliding direction; and
a stopper located between the first end and the second end of the guiding slot and adapted to move out of the guiding slot along a moving direction perpendicular to the sliding direction,
wherein when the sliding portion is located at the first end of the guiding slot, a first angle is formed between the back cover and the first bracket,
when the sliding portion slides in the guiding slot to abut the stopper, a second angle is formed between the back cover and the first bracket, and
when the stopper moves out of the guiding slot and the sliding portion slides to the second end of the guiding slot, a third angle is formed between the back cover and the first bracket.

2. The supporting device according to claim 1, further comprising a second bracket having a first side and a second side opposite to each other, wherein the first bracket is pivotally connected to the first side of the second bracket, and the back cover is pivotally connected to the second side of the second bracket.

3. The supporting device according to claim 2, wherein the second bracket comprises two first portions opposite to each other and a second portion connected between the two first portions, and the back cover is pivotally connected to the second portion.

4. The supporting device according to claim 3, wherein the first bracket comprises two third portions opposite to each other and a fourth portion connected between the two third portions, and the two third portions are respectively pivotally connected to the two first portions.

5. The supporting device according to claim 2, further comprising a button exposed on the first bracket and connected to the stopper, wherein when the button is in an unpressed state, the stopper is located in the guiding slot, and when the button is in a pressed state, the stopper is moved out of the guiding slot along the moving direction.

6. The supporting device according to claim 5, wherein the guiding portion comprises a guiding slot top wall facing the second bracket, and the guiding slot top wall has a notch, wherein when the button is in the pressed state and moved along the moving direction, the stopper is driven to move to the notch to allow the sliding portion to pass.

7. The supporting device according to claim 5, further comprising:
an elastic member accommodated in the button and having a first fixing end and a second fixing end; and
a stop plate covering the button, wherein the first fixing end of the elastic member is connected to a bottom portion of the button, and the second fixing end of the elastic member is connected to the stop plate.

8. The supporting device according to claim 7, wherein the button further comprises a guide post located on the bottom portion, and the elastic member is sleeved on the guide post.

9. The supporting device according to claim 7, wherein when the button is in the unpressed state, a reserved gap is formed between the stop plate and the button, and when the button is in the pressed state, the button moves toward the stop plate and compresses the elastic member, and the reserved gap is reduced.

10. The supporting device according to claim 1, wherein the sliding portion comprises a cap portion and a neck portion connected to the cap portion, wherein the neck portion is fixed to the back cover, the neck portion slides in the guiding slot along the sliding direction, and a dimension of the cap portion is larger than a dimension of the guiding slot.

* * * * *